United States Patent [19]
Tsuchiya et al.

[11] Patent Number: 5,917,787
[45] Date of Patent: Jun. 29, 1999

[54] DISK PLAYER

[75] Inventors: Tatuhiko Tsuchiya; Toshiyuki Suzuki; Hideaki Takasawa; Takeshi Yoshida, all of Iwaki, Japan

[73] Assignee: Alpine Electronics, Inc., Japan

[21] Appl. No.: 08/903,338

[22] Filed: Jul. 30, 1997

[30] Foreign Application Priority Data

Aug. 23, 1996 [JP] Japan .................................. 8-222643

[51] Int. Cl.[6] .................................................. G11B 17/22
[52] U.S. Cl. ............................................. 369/36; 369/178
[58] Field of Search ................................. 369/34, 36, 38, 369/191–194, 178; 360/92

[56] References Cited

U.S. PATENT DOCUMENTS

| | | | |
|---|---|---|---|
| 5,117,409 | 5/1992 | Shimizu et al. | 369/36 |
| 5,130,959 | 7/1992 | Wakatsuki et al. | 369/77.2 |
| 5,138,591 | 8/1992 | Ogawa et al. | 369/36 |
| 5,481,512 | 1/1996 | Morioka et al. | 369/36 |
| 5,561,657 | 10/1996 | Ogawa | 369/179 |

FOREIGN PATENT DOCUMENTS 2-294967  12/1990  Japan .

Primary Examiner—William J. Klimowicz
Attorney, Agent, or Firm—Brinks Hofer Gilson & Lione

[57] ABSTRACT

A disk player including a 1 DIN size housing, a plurality of disk holders stacked in the housing, a selecting member for moving the disk holders to provide a space below a selected disk holder, and a driving member for moving into the space and aligning with a center of a disk supported on the selected disk holder. Each disk holder has a recessed portion for receiving a disk therein such that the disks are horizontal, and projections which are slidably connected to the housing such that the disk holders are only movable in a vertical direction within the housing. The selecting member is slidable in the horizontal direction and includes a plurality of elongated guide grooves, each elongated guide groove receiving the projection extending from one of the disk holders such that movement of the selecting member relative to the housing causes movement of a selected disk holder in the first direction. The driving member is mounted on a drive base which pivots to position the driving member under the disk.

18 Claims, 8 Drawing Sheets

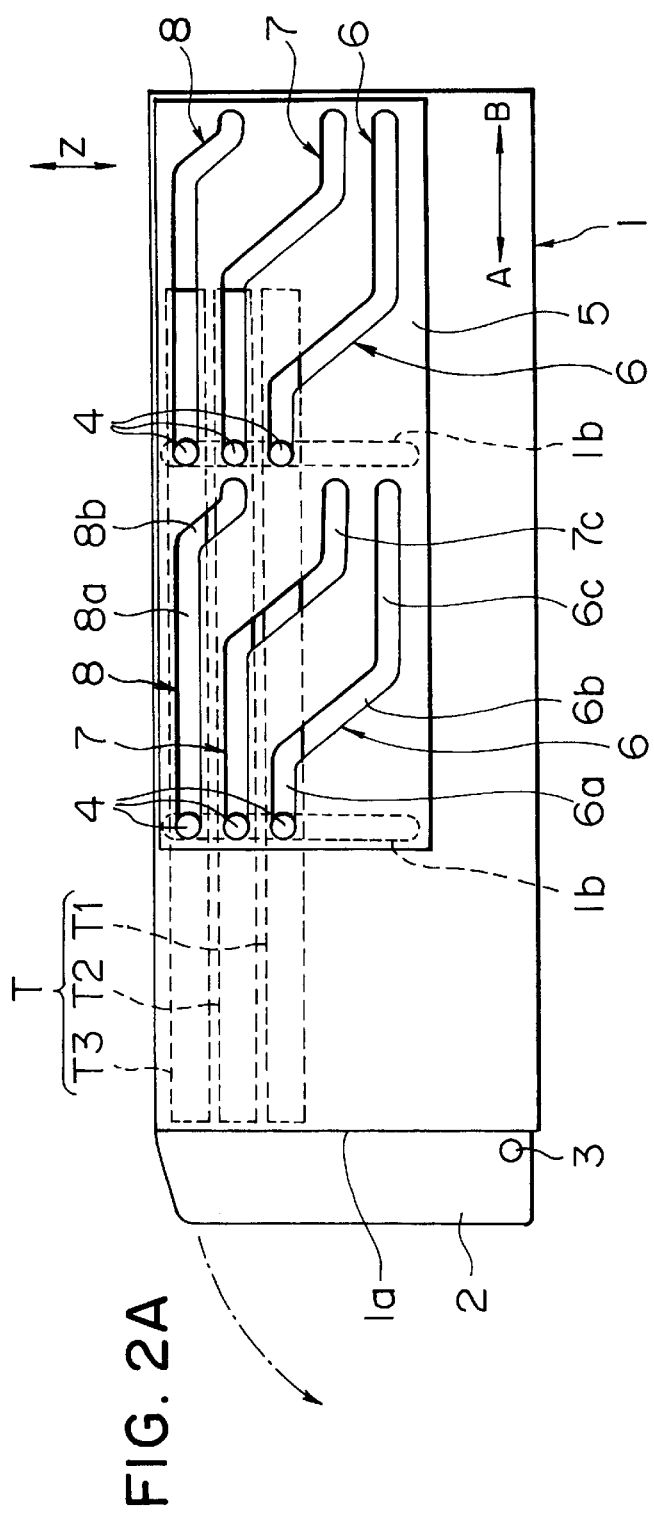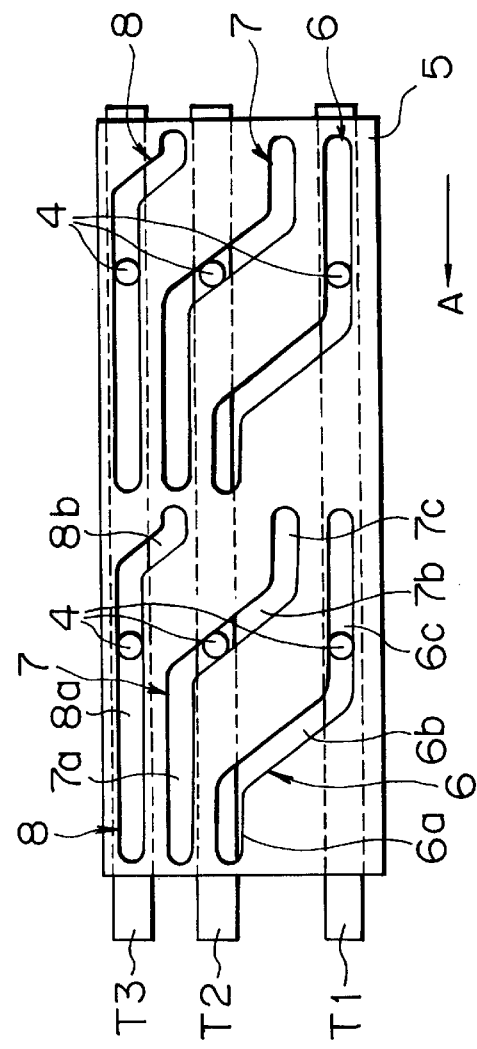
FIG. 2A
FIG. 2B

DISK PLAYER

BACKGROUND OF THE INVENTION

1. Field of the Invention Storing

The present invention relates to a disk player which accommodates a plurality of disks, selects one of the disks and records/reproduces to/from the selected disk.

2. Description of the Related Art

Conventional magazine-loading disk players typically include a magazine in which a plurality of disks are stacked, a selection mechanism for selecting one of the plurality of disks, a driving member for driving (rotating) the selected disk, and a head for recording and/or reproducing information stored on the selected disk. The magazine is first loaded in a magazine loading area provided in a housing of the disk player. Upon receiving an appropriate command, one of the disks is selected and drawn out of the magazine into a drive area of the housing by the selection mechanism. The selected disk is then supported and rotated by the driving member, and recording or reproduction of information to/from the disk is performed by the head.

A problem with the above-mentioned magazine-loading disk player is that the housing thereof must provide both the magazine loading area and the drive area. This requires a wide space in the housing and therefore increases the overall size of the disk player. Although the magazine-loading disk player can be installed in a trunk of a car or intended for home use (where its large size is not a significant problem), it is impossible to adapt the above-described magazine-loading mechanism to produce a disk player having a so-called 1-DIN housing such that it may be installed in a console box of the car.

SUMMARY OF THE INVENTION

An object of the present invention is to address the above-mentioned problem associated with conventional magazine-loading disk drives by providing a disk drive in which the disk driving area and the magazine-loading area are combined, thereby reducing the size of the housing.

Another object of the present invention is to provide a disk player having a simple mechanism for selecting and driving one of a plurality of closely-arranged disks.

A further object of the present invention is to provide a disk player capable of securely holding a disk on a rotating driving member.

A disk player according to a first embodiment of the present invention comprises a plurality of disk holders, each disk holder having a disk set thereon, the disks being stacked in a direction which is orthogonal to a plane defined by each disk. A selecting member is movably connected to the disk holders for altering the relative positions of the disk holders in accordance with a moving position thereof. The selecting member includes guide grooves for increasing the space between a selected disk holder and an adjacent disk holder by moving the adjacent disk holder away from the selected disk holder. A driving member is disposed adjacent the disk holders for moving into the space between the disks, and for rotatably supporting the disk on the disk holder.

The disk player of the first embodiment may further comprise an urging (resilient) member for urging the plurality of disk holders in a direction such that the disk holders move toward one another, wherein the selecting member moves the disk holder adjacent to the selected disk holder against the urging force of the urging member, thereby increasing the space between the adjacent disk holder and the selected disk holder.

A disk player according to a second embodiment of the present invention comprises a plurality of disk holders, each disk holder having a disk set thereon, such that the disks are stacked in a direction orthogonal to a plane defined by the disks, a guide member for restricting the movement of the disk holders such that they are movable only in a direction intersecting the plane of the disks held in the disk holders, and a selecting member for moving relative to the supporting member and for positing the disk holders in accordance with a moving position thereof. The selecting member includes a guide groove including an initial guide portion for supporting adjacent disk holders at a predetermined spacing when the selecting member is in an initial position, and a slanting portion for increasing the space between the adjacent disk holders as the selecting member moves from the initial position. A rotating driving member is provided for moving into the space between the disk holders and rotatably supporting the disk on the selected disk holder when the space is increased.

A disk player according to a third embodiment of the present invention comprises a plurality of disk holders, each disk holder provided with a recessed portion for receiving a disk thereon, the disk holders being stacked in a direction orthogonal to a plane of the disk, a guide member for restricting movement of the disk holders to the direction intersecting the disk plane, and a selecting member for moving relative to the guide member and setting the positions of the disk holders in accordance with a moving position thereof, wherein the selecting member includes a guide groove having an initial guide portion for supporting the plurality of disk holders at predetermined spacings when the selecting member is in an initial position and an opening guide portion for moving disk holders located on both sides of a selected disk holder apart from the selected disk holder as the selecting member moves from the initial position, and there is mounted a driving member for moving into the space between the disk holders when the space is increased and rotatably supporting the disk on the selected disk holder.

In the above-mentioned third embodiment, the disk player may be so constructed that, when the spaces between three adjacent disk holders are increased, the driving member comes between the selected disk holder and the disk holder on one side and a clamping member for nipping the disk with the driving member comes between the selected disk holder and the disk holder on the other side.

A disk player according to a fourth embodiment comprises a plurality of disk holders each having a disk set thereon and stacked in a direction orthogonal to a plane of the disk, a guide member for restricting movement of the disk holders to a direction intersecting the disk plane, a selecting member for moving relative to the guide member and setting the positions of the disk holders in accordance with a moving position thereof, and a driving member for coming between adjacent disk holders and fitting in a center hole of a disk set on a selected disk holder from one side, wherein the selecting member includes a guide groove including a portion for, when or after the disk is supported by the driving member, moving the selected disk holder toward the driving member such that the disk is supported by the driving member.

In the above-mentioned disk players, it is preferable that the guide groove of the selecting member include a separating guide portion for, after the driving member moves beneath the selected disk holder and coincides with the center of the disk, moving the selected disk holder below the driving member such that the disk is supported by the driving member.

It is preferable that the separating guide portion be in the form of a slanting portion of the guide groove.

It is preferable that the selecting member include an extended guide portion directly connected to the opening guide portion and extending in a direction in parallel with the disk recording plane, and, when the selected disk is separated from the selected disk holder by the separating guide portion, and that a disk holder located under the selected disk holder be restrained by the extended guide portion from further moving apart from the selected disk holder.

In the disk player according to the present invention, a plurality of disk holders in the shape of, for example, a tray, are stacked, and one disk is set on each of the disk holders. The disk to be used is a CD, a DVD, a disk contained in a cartridge like an MD, and the like.

It is preferable that the disk holders be so arranged that the disks to be set thereon are placed in a horizontal position. However, a plurality of disk holders may be arranged in an upright position.

The selecting member is driven by the power of a motor or the like to, for example, linearly move forward and backward, and the moving position thereof is always monitored by a sensor or the like and determined by controlling the drive amount of the motor. The initial guide portion, the opening guide portion, the fitting guide portion and the separating guide portion are formed of, for example, a plurality of slots, grooves or projected rails directly connected in the selecting member. Slide projections formed on each disk holder slidably fit in the guide portions, and the disk holder is thereby moved directly or indirectly along the guide portions.

When the disk holders are guided by the guide portions, the spaces between the adjacent disk holders may be increased while the disk holders are in parallel with one another, or the disk holders each pivotally supported at one end may be separated from one another by pivoting on the end.

The driving member includes, for example, a turntable which moves between the disk holders when the space between the disk holders is increased, and clamps a disk placed thereover or thereunder. After the disk is clamped, an optical head or the like comes between the disks, the clamped disk is rotationally driven, and recording or playback of the disk is performed by the optical head or the like.

A preferable disk driving member is provided with a self-clamping mechanism in which holding claws protrude from the rim of a centering boss and holds the center hole of the disk.

Although the selecting member can be formed of one movable lever, the positions of the disk holders may be set by combining operations of a plurality of selecting members.

BRIEF DESCRIPTION OF THE DRAWINGS

FIGS. 2A and 2B are side views of the disk player shown in FIG. 1 as viewed from the direction of the arrow II, wherein FIG. 2A illustrates a state in which a selecting member is in an initial position, and FIG. 2B illustrates a state in which a tray T1 and a tray T2 are separated.

FIG. 3A illustrates a state in which a rotating drive member is opposed to the lower surface of a selected tray, and FIG. 3B illustrates a state in which a disk and the tray are separated.

FIG. 5A illustrates a state in which the space between trays is opened up, and FIG. 5B illustrates a state in which a disk and a tray are separated.

DESCRIPTION OF THE PREFERRED EMBODIMENTS

The present invention will be described below with reference to the accompanying drawings.

A first embodiment of the present invention is shown in FIGS. 1, 2A, 2B, 3A and 3B.

Figure 1:
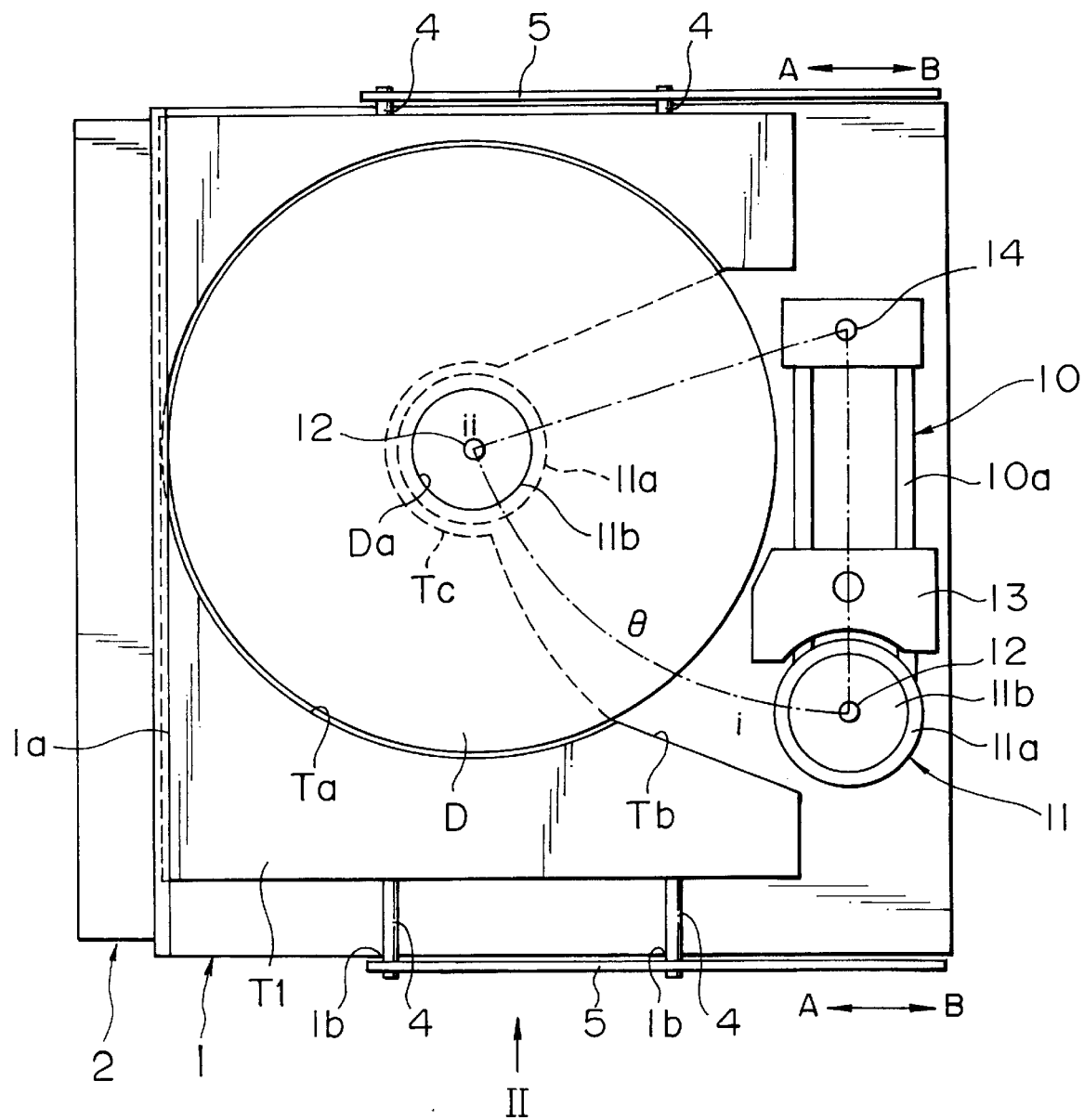
FIG. 1 is a modified top view of a disk player according to a first embodiment of the present invention.

In accordance with the present invention, a disk player includes a housing 1 of, for example, 1-DIN size, which can be mounted in a console box of a car or the like. A control device 2 is mounted on the front of the housing 1. The control device 2 is, as shown in FIG. 2A, pivotally supported on the housing 1 by a support shaft 3 such that the control device 2 is allowed to pivot, as shown in FIGS. 1 and 2A, between a position covering a front portion 1a of the housing 1 and a position tilted away from the front portion 1a (as indicated by the arrow). Various control buttons and displays (not shown) are disposed on the front surface of the control device 2. When the control device 2 is tilted away from the front portion 1a, an opening through which disks can be inserted is exposed on the front portion 1a of the housing 1.

As shown in FIG. 2A, a plurality of trays (disk holders) T are mounted inside the housing 1. Although only three trays T1, T2 and T3 are shown in FIGS. 2A and 2B for convenience of explanation, the number of trays T may be four or more. Each tray T has a recessed portion Ta for receiving a disk D. The trays T are stacked in a (vertical) direction which is orthogonal to the (horizontal) planes defined by the disks D. The trays T1, T2 and T3 have a common shape. As shown in FIG. 1, each circular recessed portion Ta in which a disk D is received is formed on the upper surface of each tray T, and a cutoff portion Tb is formed on the tray T in the inner part of the housing 1. Furthermore, a hole Tc through which a center hole Da of the disk D is exposed is formed at the center of the above-mentioned concave portion Ta.

In the embodiment shown in FIG. 1 and FIG. 2A, the disks D are inserted one by one through the front opening 1a of the housing 1 onto the trays T1, T2 and T3. Each tray T may have such structure that a first portion of the tray T including the recessed portion Ta for holding the disk D thereon, can be separated from a second portion and drawn out through the opening 1a of the housing 1 to receive the disk D in the recessed portion Ta thereof.

The trays T1, T2 and T3 respectively have two shaft-like slide projections 4 extending from each side thereof. The slide projections 4 are formed integrally with the tray T or planted in the side of the tray T. As shown in FIG. 2A, two guide slots 1b extending linearly in the vertical direction (the direction of the arrow Z) are formed on each side of the housing 1, and the slide projections 4 are slidably received in the guide slots 1b.

In the embodiment shown in FIG. 1 and FIG. 2A, the housing 1 functions as a guide member for guiding a plurality of trays T1, T2 and T3. The trays T1, T2 and T3 are guided to move in the Z direction (a direction orthogonal to the plane defined by the disks D in the figures) by the housing 1. A separate guide member may be added inside the housing 1 to guide the slide projections of the trays movably in the Z direction.

Selecting members 5 made of plates are respectively mounted on both sides of the housing 1. Each of the selecting members 5 is supported by a guide portion linearly extending in an A-B direction on each side of the housing 1 to reciprocate linearly in the A-B direction. Although the guide portion is not illustrated, for example, it is made up by a slot of the selecting member 5 extending linearly in the A-B direction and a guide pin fixed on the side of the housing 1 to guide the slide of the slot. The selecting members 5 respectively formed on both sides of the housing 1 are moved in the A-B direction in synchronization with each other in response to a driving force applied by a motor. Furthermore, the positions of the selecting members 5 moving in the A-B direction are recognized by a linear sensor or a detector for detecting the number of rotations of the motor, and controlled according to the detected/sensed position. In the above-mentioned case where the separate guide member for guiding the trays T is mounted inside the housing 1, the selecting members 5 are supported by the guide member to linearly move inside the housing 1.

The selecting members 5 each have a first selecting guide 6, a second selecting guide 7 and a third selecting guide 8 formed in order from the bottom thereof. As shown in FIG. 2A, the selecting guides 6, 7 and 8 in the shape of an elongated slot or groove are respectively formed in right and left pairs. The slide projections 4 of the lowermost tray T1 are inserted in the first selecting guides 6, the slide projections 4 of the second (center) tray T2 are inserted in the second selecting guides 7 and the slide projections 4 of the third (uppermost) tray T3 are inserted in the third selecting guides 8, thereby setting the positions of the trays T1, T2 and T3 in the Z direction (in the direction orthogonal to the disk plane) in accordance with the position of the selecting member 5 in the A-B direction.

As shown in FIG. 2A, the first lowermost selecting guide 6 consists of an elongated groove including an initial (first) guide portion 6a, an opening and separating (slanting) guide portion 6b and an extended (second) guide portion 6c, which are arranged in order from an A-side end to a B-side end of the first selecting guide portion 6. These guide portions 6a, 6b and 6c are formed continuously. The initial guide portion 6a and the extended guide portion 6c extend linearly in parallel with the moving direction of the selecting member 5 (A-B direction), and the opening and separating guide portion 6b is slanted diagonally relative to the Z direction and the A-B direction.

Similarly, the second center selecting guide 7 consists of an initial guide portion 7a, an opening and separating guide portion 7b and an extended guide portion 7c which are directly connected. The opening and separating guide portion 7b and the extended guide portion 7c of the second selecting guide portion 7 are formed above the extended guide portion 6c of the first selecting guide 6 so that the opening and separating guide portions 6b and 7b do not overlap. The uppermost third selecting guide 8 consists of an initial guide portion 8a extending from the A-side end to the B-side end in parallel with the A-B direction, and a separating guide portion 8b slanted downward. The separating guide portion 8b is formed above the extended guide portion 7c of the second selecting guide portion 7 not to overlap with the opening and separating guide portion 7b.

As shown in FIG. 1, a drive base 10 and a column 14 extending in the Z direction are mounted in the housing 1. A base end portion of the drive base 10 is supported pivotally on the column 14, and the drive base 10 is slidable in the axial direction of the column 14.

A rotation shaft 12 is rotatably supported at the leading end of the drive base 10. At the top end of the rotation shaft 12, a driving member (turntable) 11 is mounted, and the bottom end of the rotation shaft 12 is rotationally driven by a motor disposed on the drive base 10 or in another position. This driving member 11 consists of a flange 11a and a boss 11b for centering a disk mounted thereon which are formed integrally. The boss 11b is provided with retractable holding claws (not shown) capable of protruding radially from the rim thereof. Furthermore, a self-clamping mechanism is built in the boss 11b to protrude and retract the holding claws from the rim of the boss 11b. When the center hole Da of the disk D is fitted on the boss 11b, the holding claws are protruded radially from the rim of the boss 11b by the self-clamping mechanism and pressed against the inner rim of the center hole Da, whereby the rim of the center hole Da of the disk D is clamped on the driving member 11.

The drive base 10 is also provided with guide shafts 10a for guiding an optical head 13. The optical head 13 is guided by the guide shafts 10a to come close to and apart from the driving member 11. The drive base 10 is further provided with a sled mechanism for moving the optical head 13 along the guide shafts 10a.

In the housing 1, a pivotally driving mechanism is mounted to make the drive base 10 pivot on the column 14 through an angle θ. When the drive base 10 is in a standby position i shown in FIG. 1, the drive base 10, the driving member 11 and the optical head 13 are positioned adjacent to (outside) the tray T and the disk D. When the drive base 10 is made to pivot clockwise at the angle θ by the above-mentioned pivotally driving mechanism, the driving member 11 coincides with the center hole Da of the disk D. This position ii is a drive position of the drive base 10.

A lifting drive mechanism is also mounted in the housing 1 to move the drive base 10, which is in the standby position i in FIG. 1, in the Z direction along the column 14. The drive base 10 is moved in the Z direction by this lifting drive mechanism, thereby moving the driving member 11 beneath the selected tray T.

The tray and disk selecting operation in the above-mentioned disk player will be now described. Hereinafter, the case in which a disk D set on the center tray T2 is selected will be given as an example.

In the disk selecting operation, as shown in FIG. 1, the drive base 10 is in the standby position i so as not to impede the movement of the tray T and the disk D thereon in the Z direction.

Referring to FIG. 2A, the selecting member 5 is in the initial position at the B-side end of the housing 1. At this time, the slide projections 4 of the trays T1, T2 and T3 are positioned in the initial guide portion 6a of the first selecting guide 6, the initial guide portion 7a of the second selecting guide 7 and the initial guide portion 8a of the third selecting guide 8, respectively. The trays T1, T2 and T3 are spaced at the shortest intervals in the upper part of the housing 1.

Figure 3A:
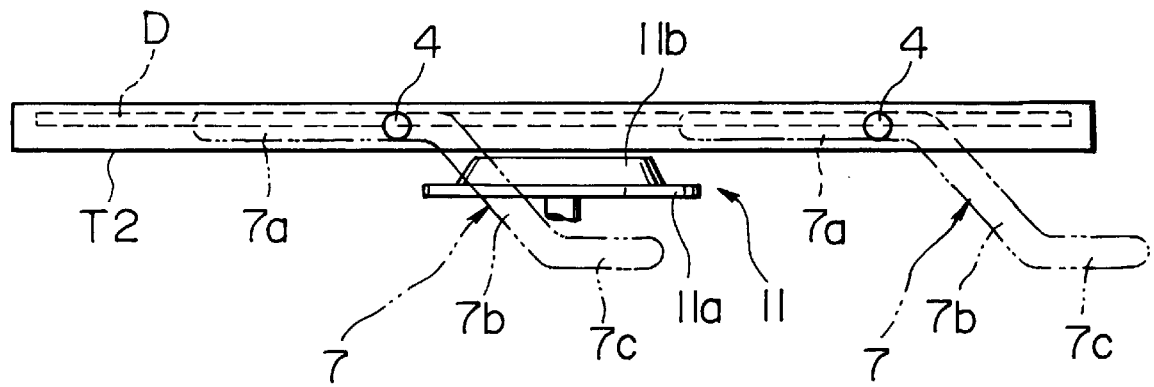
FIGS. 3A and 3B are partial side views of the disk player of FIG. 1, where
Figure 3B:
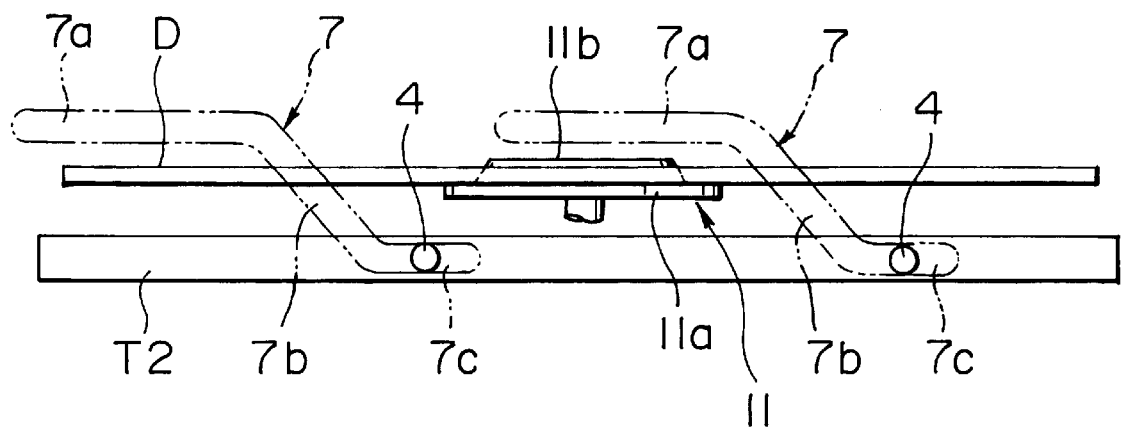

When the center tray T2 is selected, the selecting member 5 is moved in the A direction from the initial position shown in FIG. 2A to reach a position shown in FIG. 3B, that is, until the slide projections 4 of the center tray T2 reach the extended guide portions 7c of the second selecting guides 7, respectively. FIGS. 3A and 3B only illustrate the positions of the second selecting guides 7 to explain the moving position of the selecting member 5.

When the selecting member 5 moves in the A direction from the initial position shown in FIG. 2A, the slide projections 4 of the lowermost tray T1 respectively come into the opening and separating guide portions 6b of the first selecting guide portions 6, thereby moving the lowermost tray T1 down. When the lowermost tray T1 is moved down by the opening and separating guide portions 6b, since the center tray T2 moves along the initial guide portions 7a of the second selecting guides 7, the space between the trays T1 and T2 increases gradually. Then, when the slide projections 4 of the center tray T2 respectively reach the open and selecting guide portions 7b of the second selecting guides 7 as shown in FIG. 2B, the center tray T2 also starts to move down.

When the center tray T2 starts to move down as shown in FIG. 2B, or immediately before the center tray T2 starts to move down as shown in FIG. 3A, the drive base 10 shown in FIG. 1 moves along the column 14 in the Z direction, and the driving member 11 is set beneath the center tray T2. In this position, the drive base 10 pivots clockwise at the angle θ shown in FIG. 1, the driving member 11 moves to the drive position ii under the tray T2 positioned as shown in FIG. 2B or FIG. 3A, and the center of the driving member 11 and the center hole Da of the disk D on the tray T2 coincide with each other.

When the selecting member 5 further moves in the A direction, the tray T2 is moved by the open and selecting guide portions 7b to a lower position than the driving member 11, and thereby, the disk D on the tray T2 is, as shown in FIG. 3B, set onto the flange 11a of the driving member 11, that is, the tray T2 and the disk D are separated from each other. Then, the boss 11b of the driving member 11 for centering fits in the center hole Da of the disk D, and the holding claws are protruded radially from the rim of the boss 11b by means of the self-clamping mechanism, thereby clamping the center hole Da of the disk D to the driving member 11.

In this state, the driving member 11 and the disk D are rotationally driven together by the power of the motor located below the driving member 11 or in another position, and recording or playback of the disk D is performed by the optical head 13.

In order to select the lowermost tray T1, immediately after or before the selecting member 5 starts to move from the initial position shown in FIG. 2A in the A direction, the driving member 11 moves to the drive position ii opposed beneath the center hole Da of the disk D on the tray T1. While the tray T1 is moved down by the opening and separating guide portions 6b of the first selecting guides 6, the disk D is set onto the driving member 11 and separated from the tray T1. The lowermost disk D is allowed to be rotationally driven.

In order to select the uppermost tray T3, the selecting member 5 is moved in the A direction, the lowermost tray T1 is moved down by the opening and separating guide portions 6b of the first selecting guides 6, and the center tray T2 is moved down by the opening and separating guide portions 7b of the second selecting guides 7, whereby the space between the trays T2 and T3 is increased. When the uppermost tray T3 is positioned at the initial guide portion 8a, or immediately after the tray T3 is moved down by the separating guide portions 8b, the driving member 11 moves to the drive position ii opposed beneath the center hole Da of the disk D on the tray T3. While the tray T3 is moved down by the separating guide portions 8b, the disk D is set onto the driving member 11. The tray T3 is further moved down and separated from the disk D, and the disk D is allowed to be driven.

Figure 4:
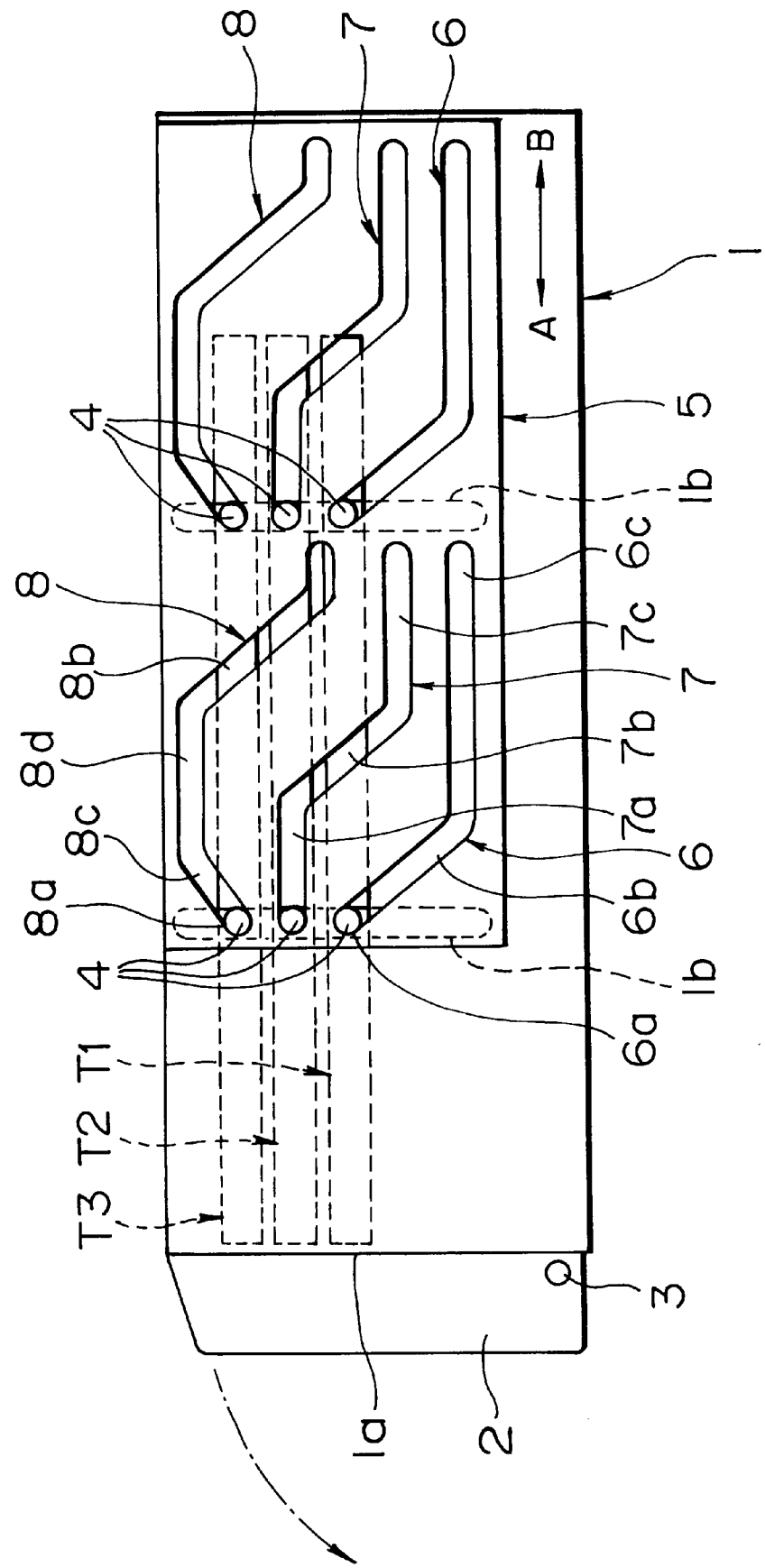
FIG. 4 is a side view of a disk player according to a second embodiment of the present invention.
Figure 5A:
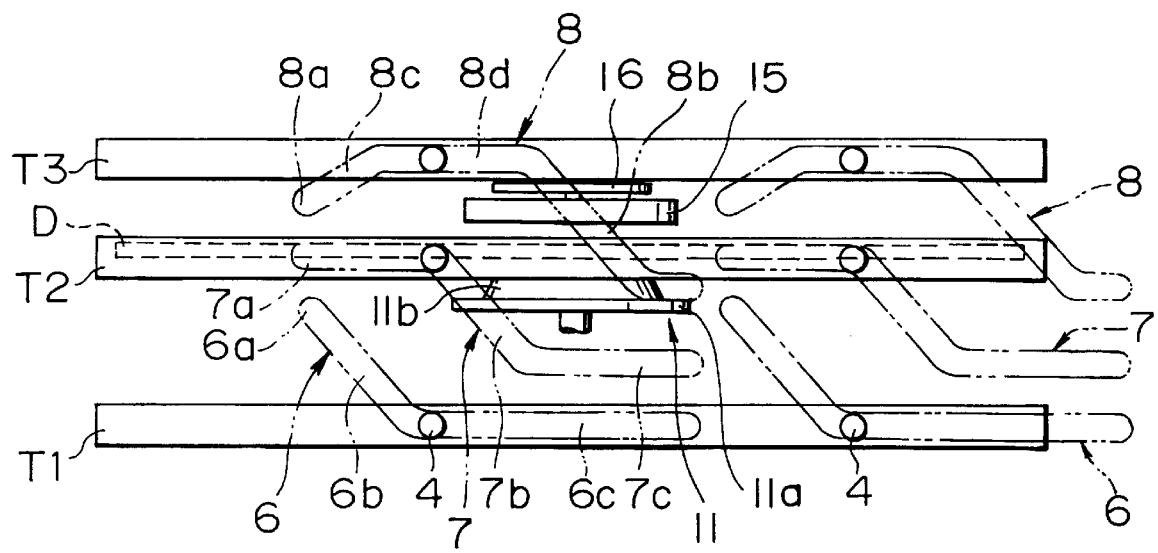
FIGS. 5A and 5B are partial side views of the disk player shown in FIG. 4, where
Figure 5B:
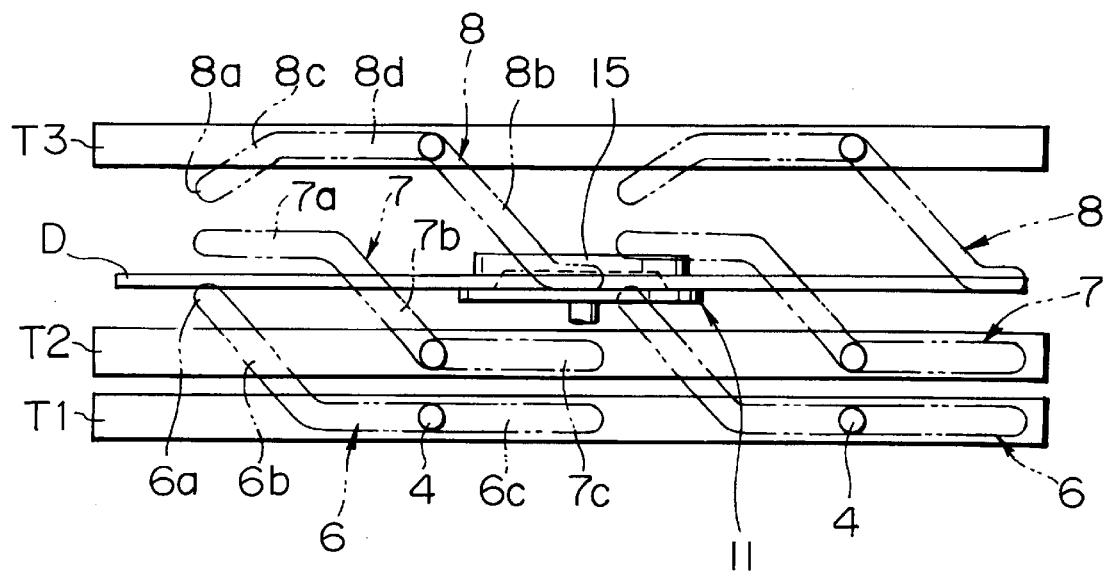

FIGS. 4 and 5 illustrate a disk player according to a second embodiment of the present invention. FIG. 4 is a side view similar to FIG. 2A, and FIGS. 5A and 5B are partial side views provided for explaining the operation according to the second embodiment.

The disk player shown in FIG. 4 and the disk player shown in FIG. 2A have the same structure except for the shape of guides 6, 7 and 8 formed on a selecting member 5.

In FIG. 4, an A-side end of a first selecting guide 6 formed in the lowermost part of the selecting member 5 functions as an initial guide portion 6a. The initial guide portion 6a is directly followed by a slanted opening and separating guide portion 6b, and an extended guide portion 6c elongating toward the B side. A second selecting guide 7 disposed in the center has almost the same shape as the selecting guide 7 shown in FIG. 2A, and consists of an initial guide portion 7a elongating linearly in the A-B direction, an opening and separating guide portion 7b and an extended guide portion 7c which are directly connected.

An A-side end of a third selecting guide 8 at the top functions as an initial guide portion 8a, and is directly followed by an opening guide portion 8c inclining upward in the B direction, and a lifting guide portion 8d extending linearly in the B direction. A separating guide portion 8b declines from the B-side end of the lifting guide portion 8d.

FIGS. 5A and 5B illustrate the operation for selecting the center tray T2.

As shown in FIG. 4, when the selecting member 5 is in the initial position at the B-side end, slide projections 4 of trays T1, T2 and T3 are placed in the initial guide portions 6a, 7a and 8a of the selecting guides 6, 7 and 8, respectively. The trays T1, T2 and T3 are spaced at the shortest and equal intervals.

When the selecting member 5 moves from the initial position in the A direction, each of the slide projections 4 of the center tray T2 moves in the linear initial guide portion 7a. Each of the slide projections 4 of the bottom tray T1 moves in the opening and separating guide portion 6b of the first selecting guide 6 to move the tray T1 down, and each of the slide projections 4 of the top tray T3 moves in the opening guide portion 8c of the third selecting guide 8 to move the tray T3 upward. Therefore, the trays T1 and T3, which are positioned below and above the center tray T2 to be selected, are moved apart from the tray T2, and the space between the trays T2 and T1 and the space between the trays T2 and T3 are increased as shown in FIG. 5A.

When the spaces between the trays are increased as shown in FIG. 5A, the drive base 10 in FIG. 1 pivots clockwise and the driving member 11 reaches the drive position ii. In other words, the driving member 11 comes between the trays T2 and T1 to be opposed beneath the center hole Da of the disk D set on the tray T2. In the embodiment shown in FIGS. 4 and 5, since the space between the tray T2 and the tray T3 is also increased as shown in FIG. 5A, a clamp arm 16 and a clamp member 15 supported thereby can be interposed between the trays T2 and T3. The clamp arm 16 is supported on the drive base 10 shown in FIG. 1 and so constructed that the clamp member 15 can move up and down with respect to the driving member 11.

When the selecting member 5 in the state shown in FIG. 5A further moves in the A direction, each of the slide projections 4 of the center tray T2 slides down along the opening and separating guide portion 7b of the second selecting guide 7 and reaches the extended guide portion 7c. During the downward movement of the tray T2, the disk D on the tray T2 is set onto the driving member 11, and the tray T2 moves to a lower position than the driving member 11 and separates from the disk D. At this time, the clamp member 15 supported by the clamp arm 16 is pressed against the driving member 11, and the center of the disk D is nipped and clamped between the driving member 11 and the clamp member 15.

Then, the disk D is rotationally driven by the driving member 11, and recording or playback of the disk D is performed by the optical head 13.

When the lowermost tray T1 is selected, the disk on the tray T1 is set onto the driving member 11 while the tray T1 moves down along the opening and separating guide portion 6b in the same manner as in FIG. 2A. When the uppermost tray T3 is selected, the disk D is set onto the driving member 11 while the uppermost tray T3 is moved down by the separating guide portion 8b after the trays T1 and T2 move down.

In the disk player illustrated in FIGS. 4 and 5, since the top and bottom trays of three adjacent trays move apart from the center tray, it is possible to use a clamping means for nipping and clamping the disk D set on the center tray T2 from above and below.

Figure 6:
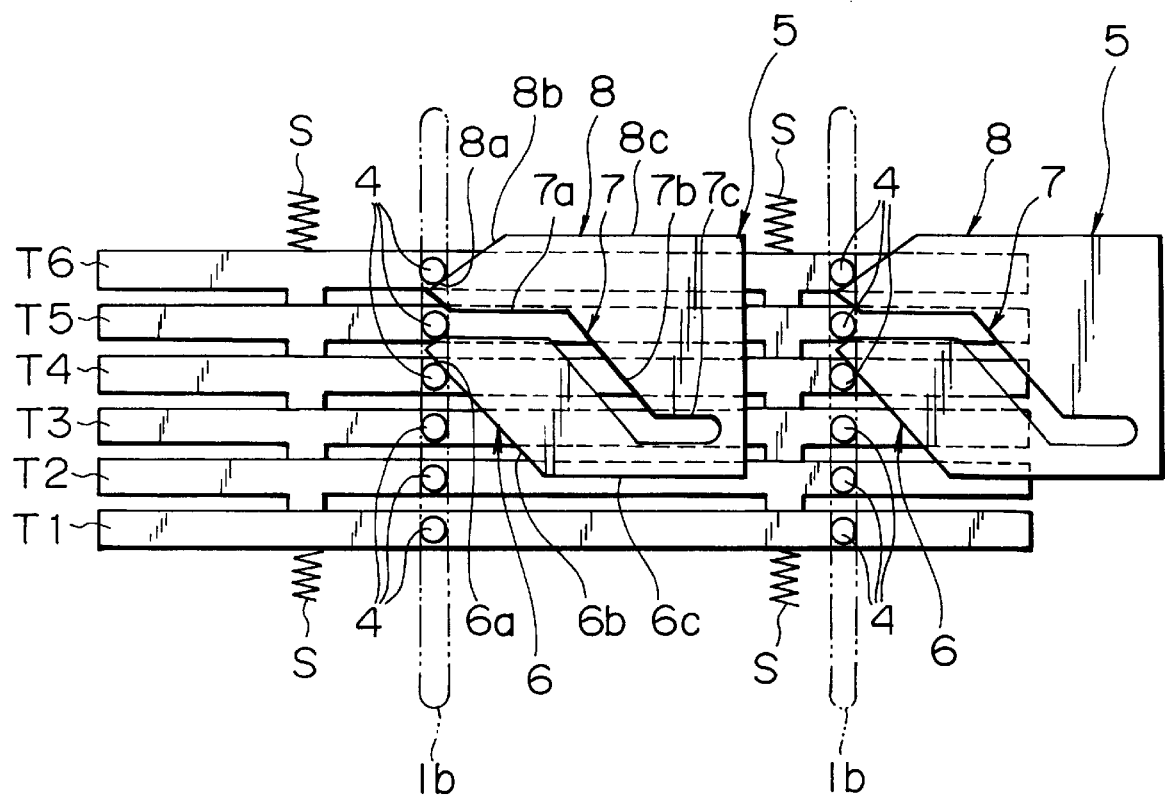
FIG. 6 is a side view of a disk player according to a modification of the embodiment shown in FIG. 4.

FIG. 6 is a side view showing a modification of the second embodiment shown in FIGS. 4 and 5.

Referring to FIG. 6, six trays T1 to T6 as disk holders are stacked in a housing 1 and pressed by springs S as urging (resilient) members from above and below. Slide projections 4 integrally formed on the trays are movable in the upward and downward directions along guide slots 1b vertically formed on the housing 1.

The housing 1 is provided with a pair of selecting members 5. A lower edge of each selecting member 5 functions as a first selecting guide 6, a center slot thereof functions as a second selecting guide 7 and an upper edge thereof functions as a third selecting guide 8. In the same manner as in FIG. 4, the first selecting guide 6 consists of an initial guide portion 6a, an opening guide portion 6b and an extended guide portion 6c. The second selecting guide 7 consists of an initial guide portion 7a, a separating guide portion 7b and an extended guide portion 7c. The third selecting guide 8 at the upper edge consists of an initial guide portion 8a, an opening guide portion 8b and a lifting guide portion 8c.

In FIG. 6, the slide projections 4 of the trays T4, T5 and T6 respectively face the fronts of the initial guide portions 6a, 7a and 8a of the selecting guides 6, 7 and 8. When the selecting member 5 moves in the leftward direction in the figures, the slide projection 4 of the tray T5 comes into the initial guide portion 7b, while the slide projections 4 of the upper and lower trays T4 and T6 are respectively moved upward and downward by the opening guide portions 6b and 8b. At this time, the trays T1 to T3 placed below the tray T4 are pressed by the tray T4 and moved downward together. When the upper three trays are separated, the driving member 11 and the clamp member 15 are placed under and over the tray T5, respectively. When the selecting member 5 further moves in the leftward direction in the figures, the slide projection 4 of the tray T5 is moved down by the separating guide portion 7b, the disk on the driving member 11 and the descending tray T5 are separated, and the disk is rotated by the driving member 11.

When the selecting member 5 is moved in the rightward direction in the figures, the trays T1 to T6 are returned into their initial state, in which the trays are pressed against each other, by the elastic force of the springs S.

In the modification shown in FIG. 6, a tray holding a disk to be driven can be selected by moving the selecting member 5 in the upward and downward directions. For example, the selecting member 5 is moved down so that the initial guide portion 7a of the second selecting guide 7 faces the slide projection 4 of the tray T3, and then moved in the leftward direction in the figure. The trays over and under the tray T3 are thereby separated and the disk on the tray T3 is loaded onto the driving member 11.

FIGS. 7A, 7B, 7C, 8A, 8B and 8C illustrate operations of a disk player according to a third embodiment of the present invention. Each figure shows the moving position of a selecting member 5 in the left part thereof, and shows the separation state of trays on the right part thereof.

The selecting member 5 shown in FIGS. 7 and 8 is mounted movably in the A-B direction with respect to a support member like the housing 1 shown in FIGS. 1 and 2A.

On the selecting member 5, a first selecting guide 21, a second selecting guide 22, a third selecting guide 23 and a fourth selecting guide 24 are formed in order from the bottom thereof. The selecting guides 21 to 24 are each shaped like a slot in the same manner as shown in FIGS. 2A and 4, and slide projections 4 of trays T1, T2, T3 and T4 are respectively positioned thereby. FIGS. 7 and 8 illustrate the slot-like selecting guides 21 to 24 in mere solid lines to simplify the illustration. Although the selecting member 5 has two right and left groups of the selecting guides 21 to 24 in the same manner as shown in FIGS. 2A and 4, FIGS. 7 and 8 show only one group thereof. The disk player according to the third embodiment has the same structure as the disk player shown in FIGS. 1 and 2A except for the shape of the selecting guides 21 to 24 formed on the selecting member 5. A driving member 11 shown in FIGS. 7 and 8 is provided with a self-clamping mechanism in which holding claws (not shown) protrude from the rim of a boss 11b for centering.

Figure 7A:
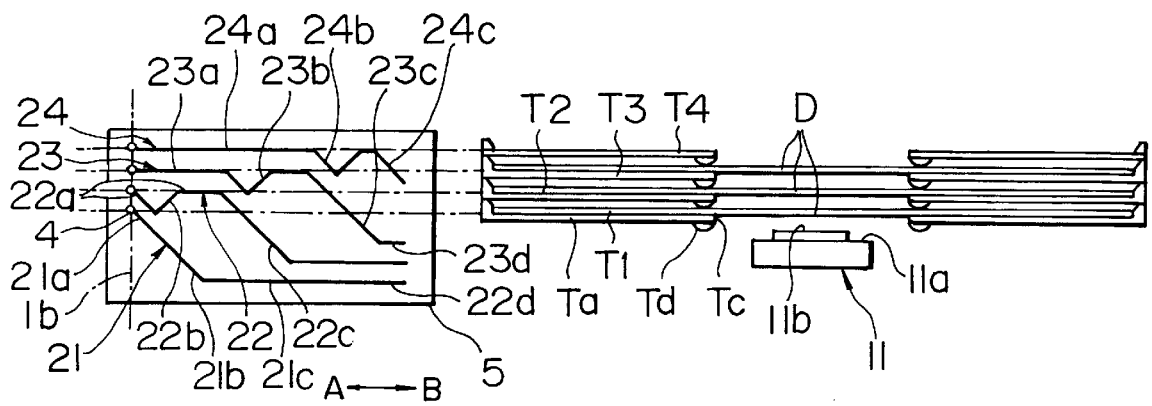
FIGS. 7A, 7B and 7C are partial views showing operation steps for selecting the lowermost tray in sequence in accordance with a third embodiment of the present invention.

As shown in FIG. 7A, the lowermost first selecting guide 21 consists of three portions directly connected, that is, an initial guide portion 21a at an A-side end thereof, an opening and separating guide portion 21b sloped downward in the B direction, and an extended guide portion 21c linearly extending in the A-B direction. The second selecting guide 22 includes an initial guide portion 22a extending from the A-side end toward the B-side end in parallel with the A-B direction, an inverse-V fitting guide portion 22b directly connected to the A-side end of the initial guide portion 22a, an opening and separating guide portion 22c sloped downward from the B-side end of the initial guide portion 22a, and an extended guide portion 22d. The third selecting guide 23 consists of an initial guide portion 23a having a predetermined length and extending from the A-side end in the B direction, an inverse-V fitting guide portion 23b formed at the midpoint of the initial guide portion 23a, an opening and separating guide portion 23c sloped downward at the B-side end of the initial guide portion 23a, and an extended guide portion 23d. The uppermost fourth selecting guide 24 consists of an initial guide portion 24a extending linearly from the A-side end in the B-direction, an inverse-V fitting guide portion 24b at the B-side end of the initial guide portion 24a, and a separating guide portion 24c sloped downward.

The selecting operation of the disk player shown in FIGS. 7 and 8 will be described below.

Figure 7B:
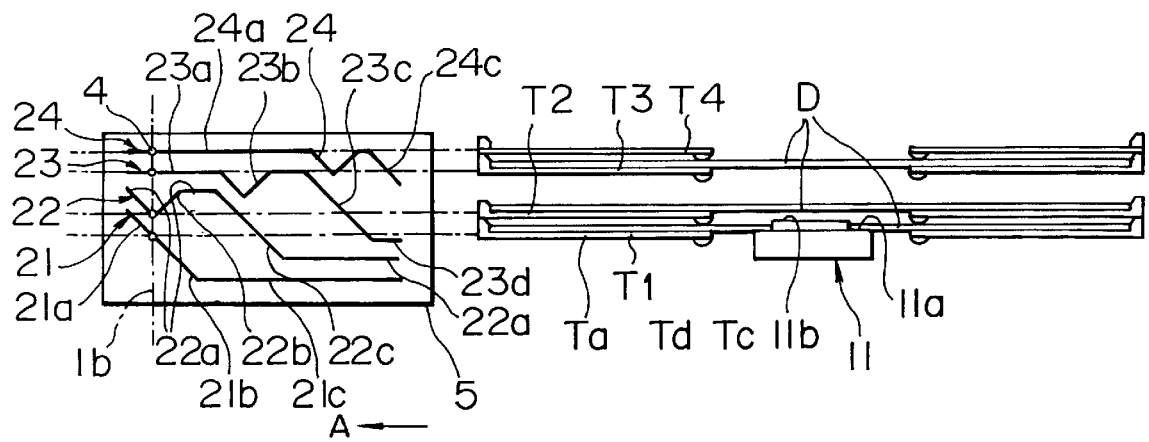
Figure 7C:
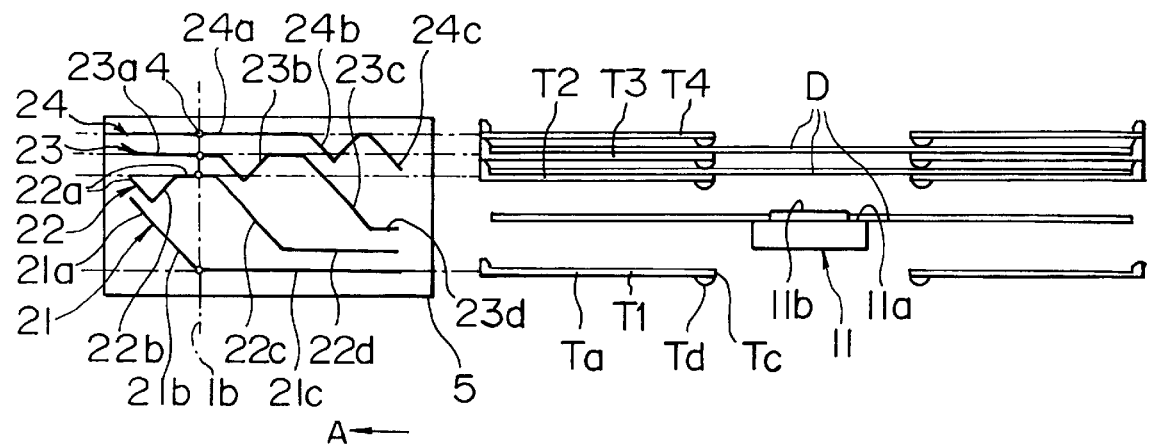
Figure 8A:
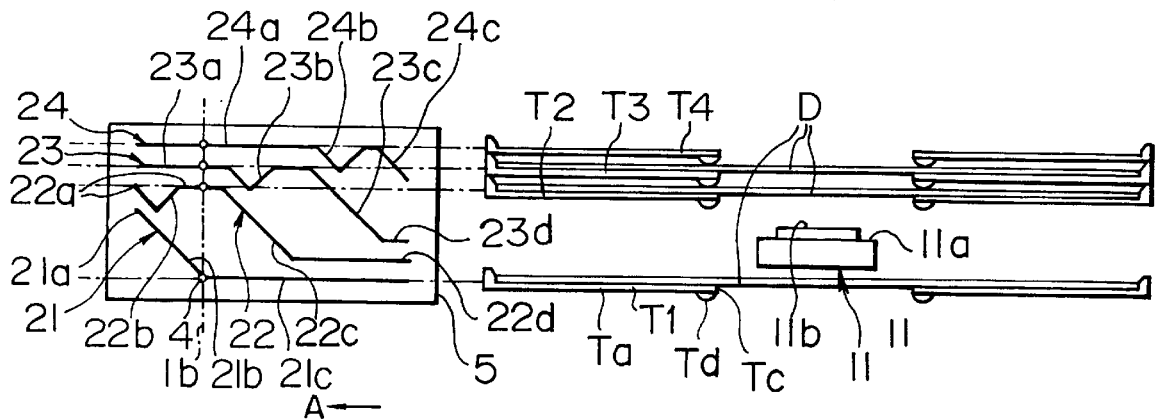
FIGS. 8A, 8B and 8C are side views showing operation steps for selecting the second tray in accordance with the third embodiment.
Figure 8B:
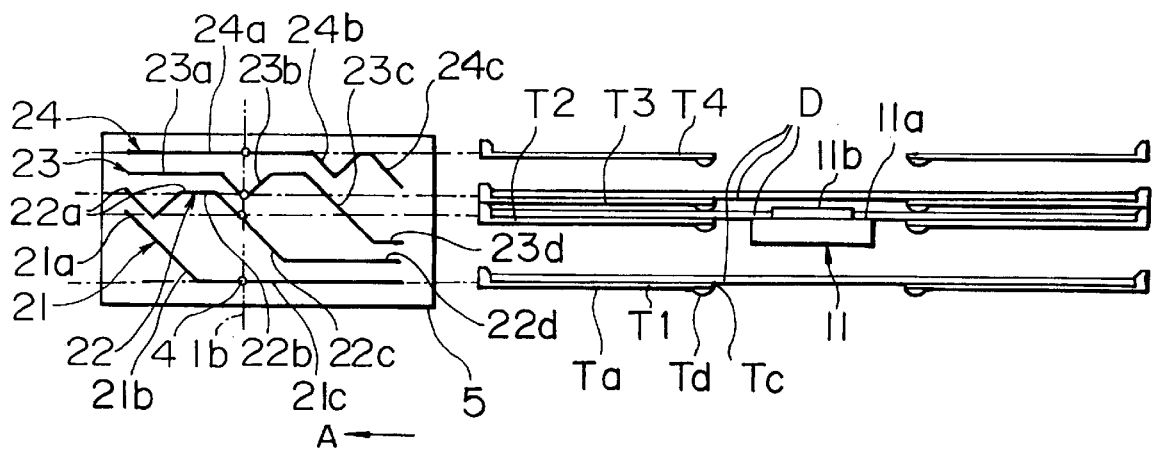
Figure 8C:
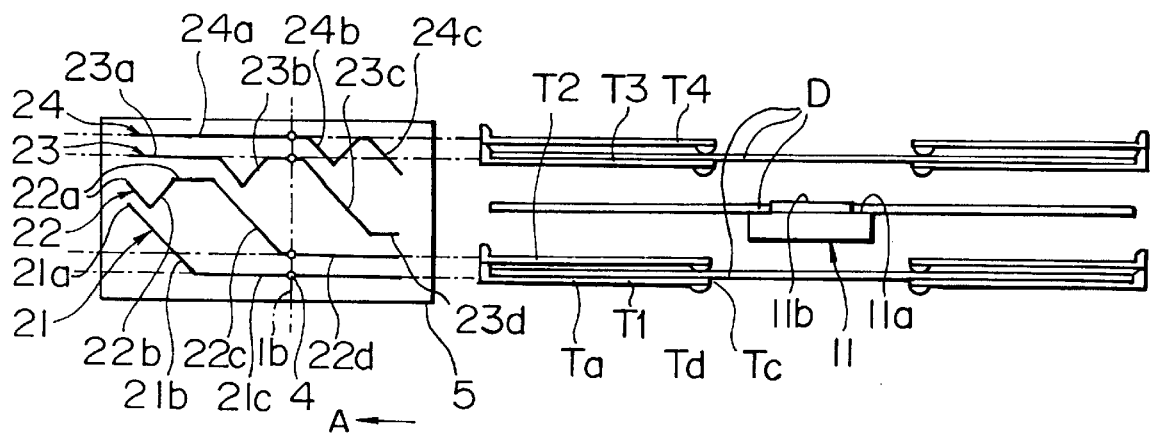

FIGS. 7A to 7C illustrate an operation for selecting the lowermost tray T1, and FIGS. 8A to 8C illustrate an operation for selecting the second tray T2 from the bottom.

Referring to FIG. 7A, the selecting member 5 is in the initial position at the B-side end. At this time, the slide projections 4 of the trays T1, T2, T3 and T4 are respectively positioned at the initial guide portion 21a of the first selecting guide 21, the initial guide portion 22a of the second selecting guide 22, the initial guide portion 23a of the third selecting guide 23, and the initial guide portion 24a of the fourth selecting guide 24. Therefore, the trays T1, T2, T3 and T4 are spaced at the shortest and equal intervals.

In this embodiment, the trays T1, T2, T3 and T4 each have a presser boss (or a support boss) Td integrally formed on the underside of the rim of a center hole Tc thereof. In the initial state shown in FIG. 7A, a disk D set on a concave portion Ta of a tray T is pressed or supported from above by a presser boss (or support boss) Td of a tray T just above.

When the lowermost tray T1 is selected, the drive base 10 shown in FIG. 1 pivots clockwise to the drive position ii in the initial state shown in FIG. 7A, and the driving member 11 is positioned under the center of the lowermost tray T1.

While the selecting member 5 moves to a position shown in FIG. 7B in the A direction, the lowermost tray T1 is moved down by the opening and separating guide portion 21b of the first selecting guide 21. At this time, the second tray T2 located over the tray T1 is also moved down along the fitting guide portion 22b of the second selecting guide 22. Therefore, the trays T1 and T2 move together while keeping the space shown in FIG. 7A. In this downward movement, a center hole Da of a disk D on the lowermost tray T1 is fitted on the centering boss 11b of the driving member ii. The disk D nipped between the tray T1 and the presser boss Td of the above tray T2 is pressed or supported on the driving member 11 by the tray T2, which enables the center hole Da of the disk D to be securely fitted on the boss 11b of the driving member 11.

When the center hole Da of the disk D is fitted on the boss 11b, the holding claws of the self-clamping mechanism built in the boss 11b protrude to clamp the center hole Da of the disk D on the boss 11b.

When the selecting member 5 moves in the A direction after that, as shown in FIG. 7C, the second tray T2 from the bottom is lifted to the initial guide portion 22a by the V-shaped fitting guide portion 22b. The lowermost tray T1 is further moved down to a lower position than the driving member 11 by the opening and separating guide portion 21b of the first selecting guide 21, and the disk D supported and clamped by the driving member 11 is separated from the tray T1. In the state shown in FIG. 7C, the disk D is rotated by the driving member 11 and recording or playback thereof is performed by the optical head 13.

Next, an operation for selecting the second tray T2 from the bottom will be described. As shown in FIG. 8A, when the lowermost tray T1 moves down to the extended guide portion 21c of the first selecting guide 21 and the slide projection 4 of the second tray T2 is positioned at the initial guide portion 22a of the second selecting guide 22, the drive base 10 shown in FIG. 1 pivots to the drive position ii. Then, the driving member 11 comes into the increased space between the trays T1 and T2 to face beneath the center hole Da of the disk D set on the tray T2.

When the selecting member 5 moves to a position shown in FIG. 8B, the tray T2 starts to be guided downward by the opening and separating guide portion 22c of the second selecting guide 22. At the initial downward movement of the tray T2, the slide projection 4 of the tray T3 disposed above is moved below the third selecting guide 23 by the V-shaped fitting guide portion 23b. Therefore, the trays T2 and T3 move down between the positions shown in FIGS. 8A and 8B while keeping a constant space therebetween, and the disk D moves down while being nipped between the concave portion Ta of the tray T2 and the presser boss Td of the tray T3. During this downward movement, the center hole Da of the disk D on the tray T2 is fitted on the boss 11b of the driving member 11, and the disk D is pressed against the driving member 11 by the presser boss Td of the tray T3, thereby securely fitting the center hole Da of the disk D on the boss 11b of the driving member 11. Then, the disk D is clamped on the driving member 11 by the above-mentioned self-clamping mechanism.

When the selecting member 5 moves to a position shown in FIG. 8C after that, the second tray T2 is moved down to the extended portion 22d of the second selecting guide 22 below the driving member 11, and the disk D clamped by the driving member 11 is separated from the tray T2 and allowed to be rotated.

An operation for selecting the third tray T3 from the bottom is similar to the above-mentioned operation for selecting the tray T2. The tray T3 is moved down by the opening and separating guide portion 23c of the third selecting guide 23, the above tray T4 is moved by the fourth fitting guide portion 24b, and the disk D nipped between the trays T3 and T4 is clamped by the driving member 11.

In selecting the uppermost tray T4, the disk D on the tray T4 is set onto the driving member 11 while the tray T4 is moved down by the separating guide portion 24c of the fourth selecting guide 24. Since no tray is disposed above the tray T4, the disk D thereon cannot be pressed against the driving member 11 by the downward movement of the upper tray. In this case, a presser member which moves down to press the disk D may be added above the tray T4. In another method, after the disk on the tray T4 is set on the driving member 11 and the tray T4 is separated from the disk and moved down, the upper surface of the disk is pressed against a presser member mounted on the ceiling of the housing 1 by lifting the driving member 11. This pressing force securely fits the disk D on the driving member 11.

As described above, according to the present invention, it is possible to select one of a plurality of disks loaded in a housing and to drive the selected disk in a disk loading area. This achieves a disk-selectable disk player having a housing of a limited size, for example, 1 DIN.

Since the disk can be separated from the tray while being set on the driving member, it is possible to rotate the disk reliably. Furthermore, the disk can be securely clamped on, for example, a driving member having a self-clamping mechanism by such construction the fitting guide portion allows a tray over the to press the disk against the driving member.

What is claimed is:

1. A disk player comprising:
a plurality of disk holders stacked in a first direction, each disk holder having a portion for receiving a disk therein such that a plane defined by the disk is aligned in a second direction which is perpendicular to the first direction, each of the plurality of disk holders being movable in the first direction;

a selecting member for moving one or more of said plurality of disk holders in the first direction such that a space is provided adjacent to a selected disk holder of said plurality of disk holders; and a driving member which is movable into the space such that the driving member is aligned with the center of a disk mounted in the portion of the selected disk holder;

wherein said selecting member is movable in the second direction and includes a plate defining an elongated guide groove, wherein said selected disk holder includes a projection extending into the guide groove such that the selected disk holder is supported by an edge of the guide groove, and wherein the guide groove includes a slanted portion aligned such that when said selecting member moves a predetermined distance in the second direction, the projection slides in the slanted portion of the guide groove such that the selected disk holder is positioned to provide said space, and, after said driving member moves into the space and aligns with the center of the disk, further movement of the selecting member in the second direction causes the selected disk holder to move toward said driving member such that the disk is separated from the selected disk holder and is supported by said driving member.

2. A disk player according to claim 1, wherein said guide groove includes a portion extending in the second direction and communicating with an end of said slanted portion of said guide groove, said slanted portion of said guide groove extending in a direction which is diagonal relative to the first and second directions.

3. A disk player according to claim 1, wherein the guide groove includes a first portion extending in the second direction and communicating with an upper end of said slanted portion, and a second portion extending in the second direction and communicating with a lower end of the slanted portion, and wherein after said selected disk holder moves below the driving member, the projection enters the second portion of the guide groove such that the selected disk holder remains stationary when the selecting member moves further in the second direction.

4. A disk player according to claim 1, further comprising a clamping member opposed to said driving member, wherein said disk is held between said clamping member and said driving member.

5. A disk player comprising:

a plurality of disk holders stacked in a first direction, each disk holder having a portion for receiving a disk therein such that a plane defined by the disk is aligned in a second direction which is perpendicular to the first direction, each of the plurality of disk holders being movable in the first direction;

a selecting member for moving one or more of said plurality of disk holders in the first direction such that a space is provided adjacent to a selected disk holder of said plurality of disk holders;

a driving member which is movable into the space such that the driving member is aligned with the center of a disk mounted in the portion of the selected disk holder; and a resilient member for biasing the plurality of disk holders toward a centrally-located disk holder, wherein said selecting member provides the space below the selected disk holder by pushing one or more of the plurality of disks against the biasing force of the resilient member.

6. A disk player according to claim 5, wherein said selecting member is movable in the second direction and includes a plate defining an elongated guide groove, wherein said selected disk holder includes a projection extending into the guide groove such that the selected disk holder is supported by an edge of the guide groove, and wherein the guide groove includes a slanted portion aligned such that when said selecting member moves a predetermined distance in the second direction, the projection slides in the slanted portion of the guide groove such that the selected disk holder is positioned to provide said space, and, after said driving member moves under the selected disk holder and aligns with the center of the disk, further movement of the selecting member in the second direction causes the selected disk holder to move below said driving member such that the disk is separated from the selected disk holder and is supported by said driving member.

7. A disk player according to claim 6, wherein said guide groove includes a portion extending in the second direction and communicating with an end of said slanted portion of said guide groove, said slanted portion of said guide groove extending in a direction which is diagonal relative to the first and second directions.

8. A disk player according to claim 6, wherein the guide groove includes a first portion extending in the second direction and communicating with an upper end of said slanted portion, and a second portion extending in the second direction and communicating with a lower end of the slanted portion, and wherein after said selected disk holder moves below the driving member, the projection enters the second portion of the guide groove such that the selected disk holder remains stationary when the selecting member moves further in the second direction.

9. A disk player comprising:

a plurality of disk holders stacked in a first direction, each disk holder having a portion for receiving a disk therein such that a plane defined by the disk is aligned in a second direction which is perpendicular to the first direction, each of the plurality of disk holders being movable in the first direction;

a selecting member for moving one or more of said plurality of disk holders in the first direction such that a space is provided adjacent to a selected disk holder of said plurality of disk holders;

a driving member which is movable into the space such that the driving member is aligned with the center of a disk mounted in the portion of the selected disk holder; and a clamping member opposed to said driving member, wherein said disk is held between said clamping member and said driving member;

wherein said selecting member is movable in the second direction and includes a plate defining an elongated guide groove, wherein said selected disk holder includes a projection extending into the guide groove such that the selected disk holder is supported by an edge of the guide groove, and wherein the guide groove includes a slanted portion aligned such that when said selecting member moves a predetermined distance in the second direction, the projection slides in the slanted portion of the guide groove such that the selected disk holder is positioned to provide said space, and, after said driving member moves under the selected disk holder and aligns with the center of the disk, further movement of the selecting member in the second direction causes the selected disk holder to move below said driving member such that the disk is separated from the selected disk holder and is supported by said driving member.

10. A disk player according to claim 9, wherein said selected disk holder is positioned between a second disk holder and a third disk holder, and said selecting member includes a second guide groove for positioning the second disk holder to provide the space between the selected disk holder and the second disk holder, and a third guide groove for positioning the third disk holder to provide a second space between the selected disk holder and the third disk holder, wherein the clamping member is movable into the second space such that the clamping member is aligned with the center of the disk mounted in the portion of the selected disk holder.

11. A disk player comprising:
a plurality of disk holders stacked in a first direction, each disk holder having a portion for receiving a disk therein such that a plane defined by the disk is aligned in a second direction which is perpendicular to the first direction;
a guide member for restricting movement of the plurality of disk holders in the first direction;
a selecting member for moving one or more of said plurality of disk holders in the first direction such that a space is provided below a selected disk holder of said plurality of disk holders; and
a driving member which is movable into the space below the selected disk holder such that the driving member is aligned with the center of a disk mounted in the portion of the selected disk holder;
wherein said selecting member is movable in the second direction and includes a plate defining an elongated guide groove,
wherein said selected disk holder includes a projection extending into the guide groove such that the selected disk holder is supported by an edge of the guide groove, and
wherein the guide groove includes a slanted portion aligned such that when said selecting member moves a predetermined distance in the second direction, the projection slides in the slanted portion of the guide groove such that the selected disk holder is positioned to provide said space, and, after said driving member moves under the selected disk holder and aligns with the center of the disk, further movement of the selecting member in the second direction causes the selected disk holder to move below said driving member such that the disk is separated from the selected disk holder and is supported by said driving member.

12. A disk player according to claim 11, wherein said guide groove includes a portion extending in the second direction and communicating with an end of said slanted portion of said guide groove, said slanted portion of said guide groove extending in a direction which is diagonal relative to the first and second directions.

13. A disk player comprising:
a plurality of disk holders stacked in a first direction, each disk holder having a portion for receiving a disk therein such that a plane defined by the disk is aligned in a second direction which is perpendicular to the first direction, each of the plurality of disk holders having a projection extending therefrom;
a guide member slidably receiving the projections of the plurality of disk holders such that movement of the plurality of disk holders is restricted to the first direction;
a selecting member including a plurality of elongated guide grooves, each elongated guide groove being connected to the projection extending from one of the plurality of disk holders such that when the selecting member is in an initial position, each projection is located in a first portion of one of the guide grooves such that a selected disk holder of the plurality of disk holders is separated from an adjacent disk holder by a first distance in the first direction, and when the selecting member is moved from the initial position, the projections move from the first portion to a second portion wherein the selected disk holder is separated from the adjacent disk holder by a second distance in the first direction which is greater than the first distance; and
a driving member which is movable between the selected disk holder and the adjacent disk holder such that the driving member is aligned with the center of a disk mounted in the portion of the selected disk holder.

14. A disk player according to claim 13, further comprising a clamping member opposed to said driving member, wherein said disk is held between said clamping member and said driving member.

15. A disk player according to claim 13,
wherein said selecting member is movable in the second direction and includes a plate defining said elongated guide grooves, and
wherein said guide grooves includes a slanted portion aligned such that when said selecting member moves a predetermined distance in the second direction, the projection of the selected disk holder slides in the slanted portion of its associated guide groove such that the selected disk holder is in a first position in the first direction, and, after said driving member moves under the selected disk holder and aligns with the center of the disk, further movement of the selecting member in the second direction causes the selected disk holder to move toward said driving member such that the disk is separated from the selected disk holder and is supported by said driving member.

16. A disk player comprising:
a housing;
a plurality of disk holders stacked in a first direction within the housing, each disk holder having a portion for receiving a disk therein such that a plane defined by the disk is aligned in a second direction which is perpendicular to the first direction, each of the plurality of disk holders having a projection extending therefrom which is slidably connected to the housing such that the plurality of disk holders are movable only in the first direction;
a selecting member slidably connected to the housing, the selecting member including a plurality of elongated guide grooves, each elongated guide groove slidably receiving the projection extending from one of the plurality of disk holders such that movement of the selecting member relative to the housing causes each projection to slide within its associated guide groove, thereby causing movement of a selected disk holder in the first direction;

a drive base having a driving member mounted thereon, the drive base being movably mounted in the housing adjacent the plurality of disk holders; and means for moving the drive base such that the driving member is aligned with the center of a disk mounted in the portion of the selected disk holder.

17. A disk player according to claim 16, wherein said selecting member includes a plate which is slidably connected to the housing such that the selecting member is restricted to move in the second direction, and wherein the guide groove receiving the projection from the selected disk holder includes a slanted portion aligned such that when said selecting member moves a predetermined distance in the second direction, the projection slides in the slanted portion of the guide groove such that the selected disk holder is in a first position, and, after said driving member moves under the selected disk holder and aligns with the center of the disk, further movement of the selecting member in the second direction causes the selected disk holder to move toward said driving member such that the disk is separated from the selected disk holder and is supported by said driving member.

18. A disk player according to claim 16, wherein said housing is a 1 DIN size.

* * * * *